United States Patent
Nishi

(10) Patent No.: US 7,067,796 B2
(45) Date of Patent: Jun. 27, 2006

(54) INTEGRATED CIRCUIT FOR OPTICAL ENCODER

(75) Inventor: Tutomu Nishi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 223 days.

(21) Appl. No.: 10/748,108

(22) Filed: Dec. 24, 2003

(65) Prior Publication Data

US 2004/0140423 A1 Jul. 22, 2004

(30) Foreign Application Priority Data

Dec. 27, 2002 (JP) ............................. 2002-379112

(51) Int. Cl.
*G01D 5/34* (2006.01)
(52) U.S. Cl. .................... 250/231.13; 250/214.1; 257/758; 257/775; 257/776; 347/234; 347/248
(58) Field of Classification Search ................ 250/231.13–231.18, 214.1; 257/448, 758, 257/775–776; 347/234, 248
See application file for complete search history.

Primary Examiner—David Porta
Assistant Examiner—Suezu Ellis
(74) Attorney, Agent, or Firm—Hogan & Hartson, L.L.P.

(57) ABSTRACT

An integrated circuit for an optical encoder comprises a signal processing section for generating a position detection signal from a detection signal of a light receiving element, a belt-like power source potential layer which is formed at least between the signal processing section and the light receiving element and whose potential is pulled up to power source potential, and a plurality of conductive layers formed at various heights higher than the power source potential layer. A connection line which intersects the power source potential layer above the power source potential layer for electrically connecting the light receiving element and the signal processing section is formed by a conductive layer of the plurality of conductive layers other than the lowermost layer, in a region immediately above the power source potential layer. By keeping the power source potential layer as far away from the connection line as possible, power source noise entering the position detection signal is reduced.

2 Claims, 9 Drawing Sheets

SCALER

POSITION DETECTION SIGNAL

POSITION DETECTION SIGNAL

INTEGRATED CIRCUIT FOR OPTICAL ENCODER

BACKGROUND OF THE INVENTION

1. Field of the Invention

The present invention relates to an integrated circuit for an optical encoder, comprising a signal processing section for generating a position detection signal from a detection signal of a light receiving element, and more particularly to an integrated circuit comprising a power source potential layer whose potential is pulled up to power source potential so as to prevent light from entering the signal processing section from a lateral direction.

2. Description of Related Art

Optical encoders and integrated circuits for signal processing as described herein are used, for example, as position detection means for a printer head. An example structure and operation will generally be described with reference to the drawings.

FIG. 1 schematically shows a structure of a position detection mechanism 12 of a printer head, including an integration circuit for optical encoder 10. As shown in FIG. 1, the position detection mechanism 12 includes a light source 14, a scaler 16, a light receiving element array 18, and a signal processing circuit 20. The belt-like scaler 16, which is movable in the directions of arrows in accordance with the movement of a printer head (not shown), alternately includes, for example, a light transmitting section (slit) 22 and a light blocking section 23, which are equally spaced along the longitudinal direction. The light source 14, the scalar 16, and the light receiving element array 18 are positioned such that light from the light source 14 passes through the light transmitting section 22 to the light receiving element array 18 but is blocked by the light blocking section 24. As shown in FIG. 1, the light receiving element array 18 and the signal processing circuit 20 are integrated into an integrated circuit 10.

FIG. 2 is a plan view (top view) schematically showing structures of the light receiving element array 18 and the signal processing circuit 20, and FIG. 3 schematically shows a structure of the signal processing circuit 20 for generating a position detection signal based on a detection signal from the light receiving element array 18 of FIG. 2. In the example shown in FIG. 2, the light receiving element array 18 comprises light receiving elements (photo diodes, for example) 26a, 26b, which belong to a plurality of groups (though only two groups are shown in FIG. 2), and these light receiving elements (namely, light receiving elements 26a of the first group and light receiving elements 26b of the second group) are alternately arranged in a line along the moving direction of the scaler 16. As shown in FIG. 3, signals output from the light receiving elements 26a and 26b of the first and second groups are then amplified by amplifiers 28a and 28b, respectively, and outputs from the amplifiers 28a and 28b are compared in a comparator 30. The signal generating circuit 20 then generates a position detection signal based on the comparison result output by the comparator 30.

FIG. 4(a) is an explanatory view showing an example of a position detection signal generated by the position detection mechanism 12, specifically an output of the signal processing circuit 20, in association with the structure of the scaler 16. As shown in FIG. 4(a), an example position detection signal rises to a high level (H) when the light transmitting section of the scaler 16 transmits light and drops to a low level (L) when light blocking section of the scaler 16 blocks light. From the number of pulses and phases of the position detection signal can be found the position to which the printer head has moved relative to the original point and its rate of movement.

In some cases, however, ringing noise as shown in FIG. 4(b) is mixed in the position detection signal generated by the position detection mechanism 12. In researching this noise, the present inventor has found that one factor contributing to such ringing noise is power source noise entering from the region where the light receiving element array 18 is electrically connected to the signal processing circuit 20. This will be described in detail with reference to the drawings.

As shown in FIG. 2, a power source potential layer 32 is provided along the periphery of the signal processing circuit so as to reduce light entering the circuit from the lateral direction. The power source potential layer 32 is a belt-like layer (a layer having a nature similar to that of a conductor formed by epitaxial growing) formed on a substrate, and the potential of the power source potential layer 32 is pulled up to power source potential (namely, power source potential is applied to the power source potential layer 32 by connecting the power source potential layer to the power source via a resistor). The entire top surface of the signal processing circuit 20 is covered with a light shielding layer so as to reduce light entering the circuit from above.

FIG. 5 is an enlarged plan view showing the boundary region L of the signal processing circuit 20 on the side of the light receiving element array 18, and FIG. 6 is a cross sectional view taken along line A—A of FIG. 5. As is clearly shown in these drawings, in the region L, a connection line 34 which electrically connects each light receiving element 26a, 26b with the interior of the signal processing circuit 20 is formed to have a multilayer structure. More specifically, the connection line 34 includes a first conductive layer 36 connected to each light receiving element 26a, 26b, a second conductive layer 38 connecting each group of the first conductive layers 36, and a through hole 40 connecting these two conductive layers 36 and 38. Thus, by forming the first conductive layer 36 and the second conductive layer 38 as different layers located at different heights to achieve a three dimensional layout, the connection lines 34 are separated for each group. Further, in the region L, both the first conductive layer 36 and the second conductive layer 38 are formed above the power source potential layer 32. These layers may be separated by an insulating layer as necessary. FIG. 5 does not show an insulating layer in order to simplify the drawing.

As shown in FIG. 6, on the substrate 42, the power source potential layer 32, an insulating layer (such as SiO2) 44, the first conductive layer 36, an insulating layer (such as SiO2) 46, the second conductive layer 38, an insulating layer (such as SiO2) 48, the light shielding metal layer 50, and an insulating layer (such as SiO2) 52 are sequentially formed in this order using a known manufacturing process. The present inventors have recognized that, with such a structure, the fact that the first conductive layer 36 and the power source potential layer 32 are located at a relatively small distance with only the insulating layer 44 being interposed between them contributes to the problem of noise. Specifically, in such a structure, power source noise is transported from the power source potential layer 32 to the first conductive layer 36, where the noise is superimposed on a detection signal supplied from the light receiving element 26a, 26b. Further, because the amplifiers 28a, 28b within the signal processing circuit 20 are high-gain amplifiers, even a small noise mixed in these amplifiers is amplified to a significant degree.

SUMMARY OF THE INVENTION

In accordance with one aspect of the present invention, there is provided an integrated circuit for an optical encoder, said circuit comprising a signal processing section for generating a position detection signal from a detection signal of a light receiving element; a belt-like power source potential layer formed at least between the signal processing section and the light receiving element, potential of the power source potential layer being pulled up to power source potential; and a plurality of conductive layers formed at different height in higher places than the power source potential layer, wherein a connection line which intersects the power source potential layer above the power source potential layer for electrically connecting the light receiving element and the signal processing section is formed by a conductive layer of the plurality of conductive layers other than the lowermost layer, in a region immediately above the power source potential layer.

In such an integrated circuit for an optical encoder, the width of the power source potential layer in the region where the power source potential layer intersects the connection line may be configured to be smaller than the width of the power source potential layer in the remaining region.

In accordance with another aspect of the present invention, there is provided an integrated circuit for an optical encoder, said circuit comprising a group of lower conductive layers including a lower conductive layer connected to each of light receiving elements belonging to a first group of light receiving elements and a lower conductive layer connected to each of light receiving elements belonging to a second group of light receiving elements, the lower conductive layers being alternately disposed in parallel to each other; two upper conductive layers disposed in parallel to each other at locations higher than the lower conductive layers and which are provided corresponding to the two groups of light receiving elements, respectively, each upper conductive layer including a first region extending in the direction intersecting the extending direction of the lower conductive layers and a second region extending along the extending direction of the lower conductive layers; a plurality of through holes connecting the lower conductive layers corresponding to each group of light receiving elements with the corresponding first region of the upper conductive layer; and a power source potential layer provided in an even lower place than the lower conductive layers, the power source potential layer extending in the direction which intersects the extending direction of the lower conductive layers and crossing the second region of the upper conductive layer under the second region of the upper conductive layer, without crossing the lower conductive layers.

Also in such an integrated circuit for an optical encoder, the width of the power source potential layer in the portion crossing the second region of the upper conductive layer under the second region of the upper conductive layer may be configured to be smaller than the with of the power source potential layer in the remaining region.

DETAILED DESCRIPTION OF THE PREFERRED EMBODIMENT

Preferred embodiments of the present invention will be described in further detail with reference to the accompanying drawings.

Embodiment 1

Figure 1:
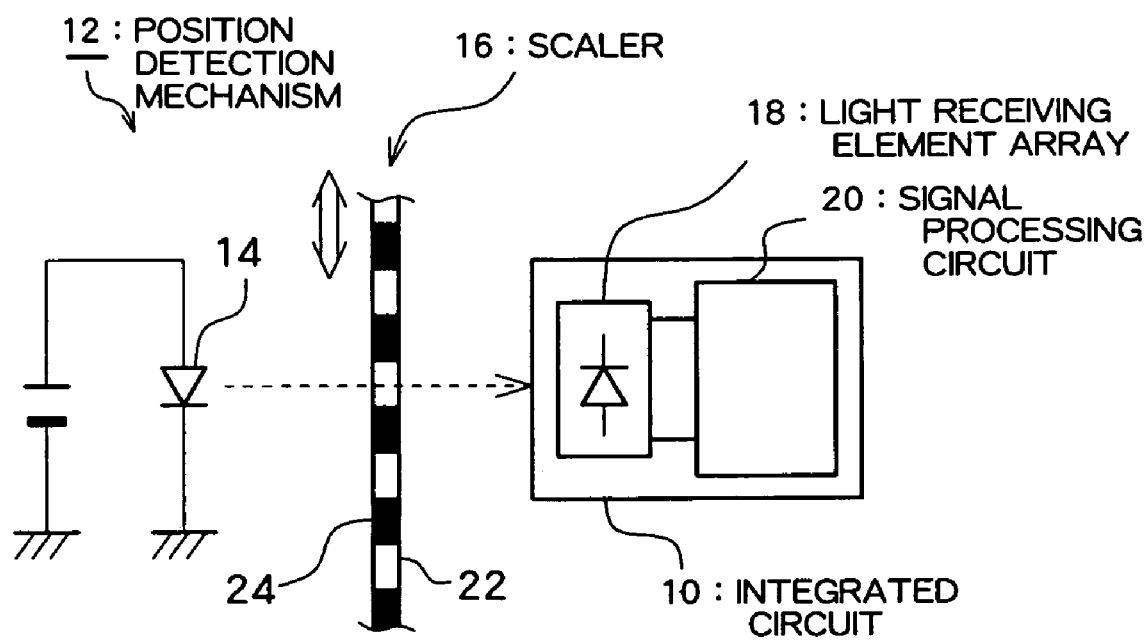
FIG. 1 schematically shows a structure of a position detection mechanism of a printer head including an integrated circuit for an optical encoder.
Figure 2:
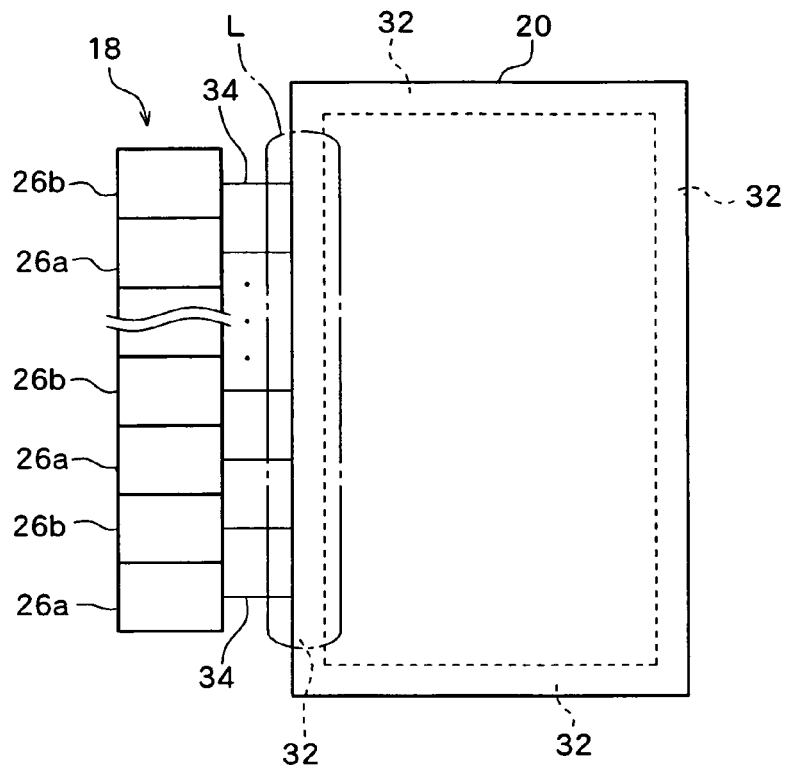
FIG. 2 is a plan view schematically showing structures of a light receiving element array and a signal processing circuit of an integrated circuit for an optical encoder.
Figure 3:
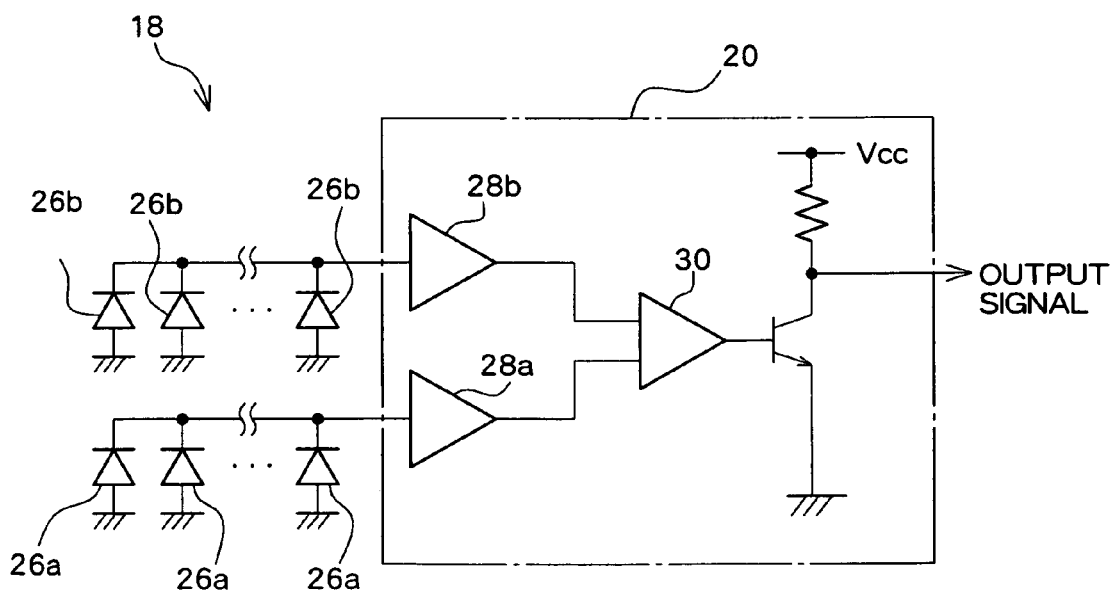
FIG. 3 is a view schematically showing the signal processing circuit for generating a position detection signal based on a detection signal of the light receiving element array of FIG. 2.
Figure 4A:
FIG. 4(a) is an explanatory view showing an example of a position detection signal by output by the position detection mechanism in association with the structure of the scaler.
Figure 4A:
Figure 4B:
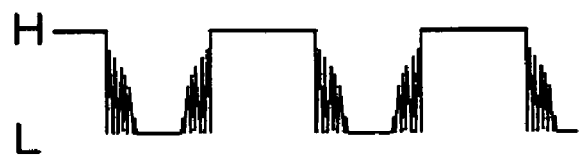
FIG. 4(b) is a view showing a state in which ringing noise is created in the position detection signal of FIG. 4(a)
Figure 7:
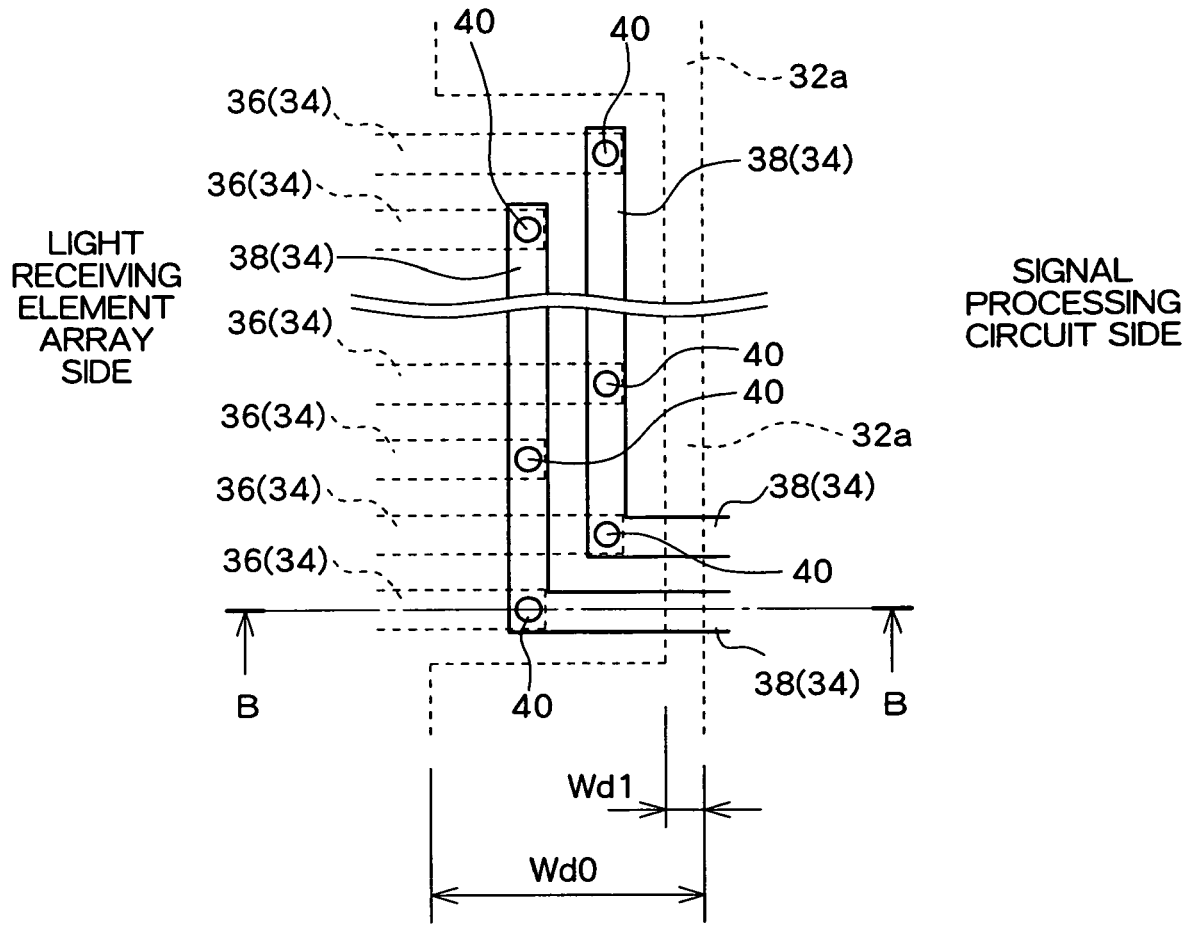
FIG. 7 is an enlarged plan view showing a boundary region, on the side of the light receiving element array, of a signal processing circuit included in an integrated circuit for optical encoder according to one embodiment of the present invention.
Figure 8:
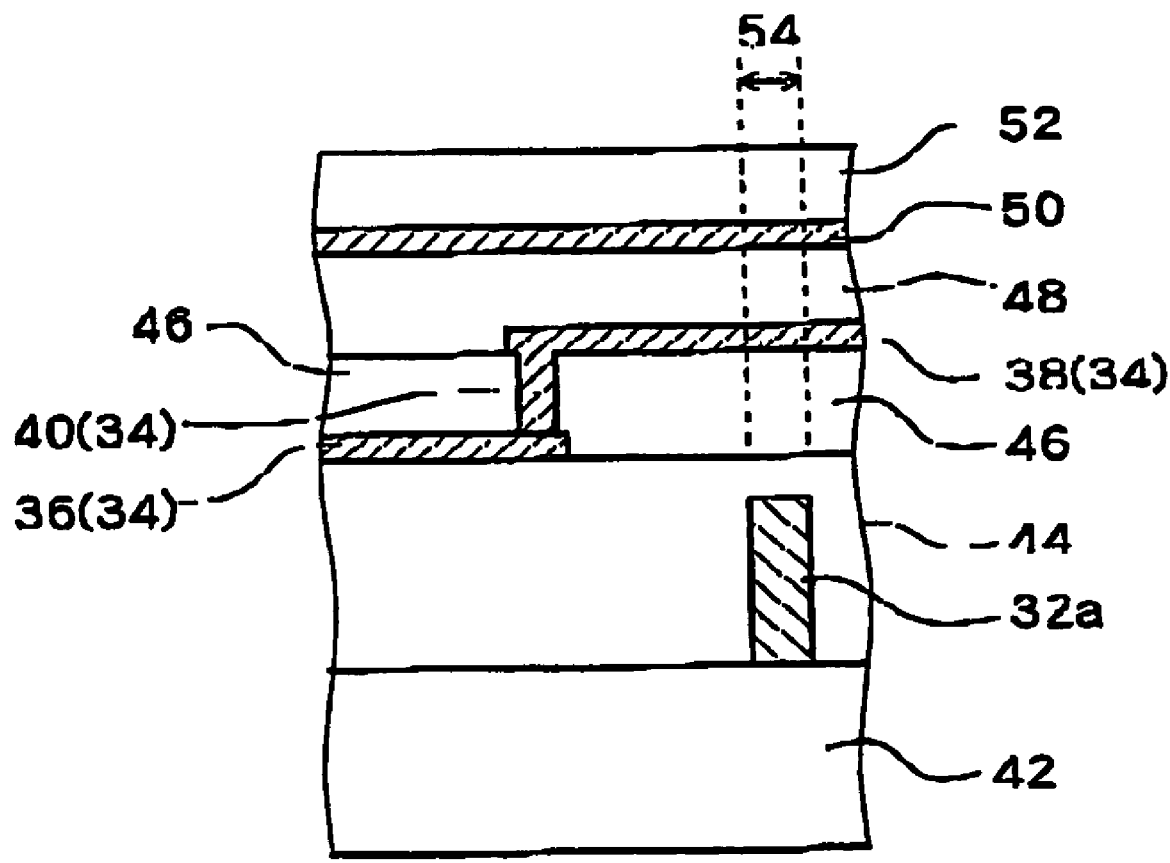
FIG. 8 is a cross sectional view taken along line B-B of FIG. 7.

FIG. 7 is an enlarged plan view showing a main portion of the boundary region (corresponding to the region L in FIG. 2), on the side of the light receiving element array 18, of the signal processing circuit included in an integrated circuit for optical encoder in accordance with a first embodiment of the present invention, and FIG. 8 is a cross sectional view taken along line H—H of FIG. 7. The integrated circuit for an optical encoder according to the present embodiment can be formed to have a structure similar to that of the conventional circuit described above except the region L. Therefore, in the following description, similar elements are denoted by the same numerals as used in the above description, and will not be described again.

Figure 5:
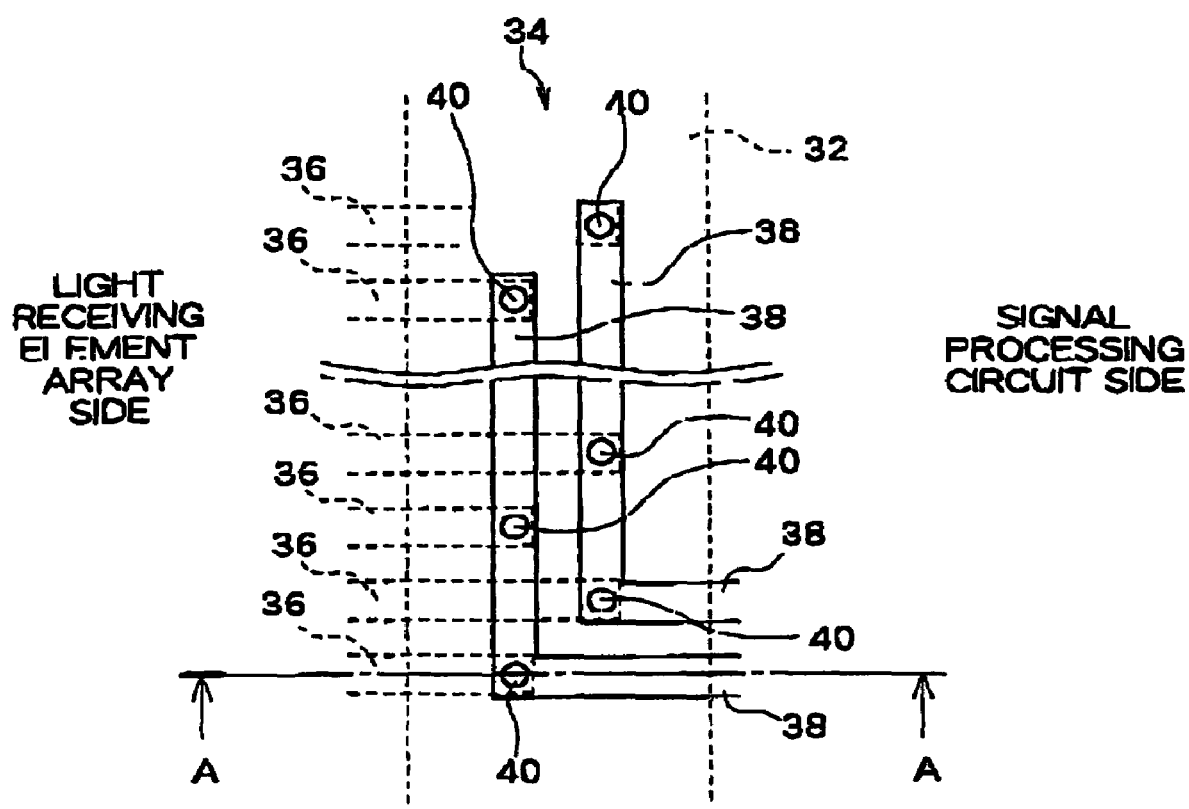
FIG. 5 is an enlarged plan view showing a boundary region of the signal processing circuit of FIG. 2 on the side of the light receiving element array.
Figure 6:
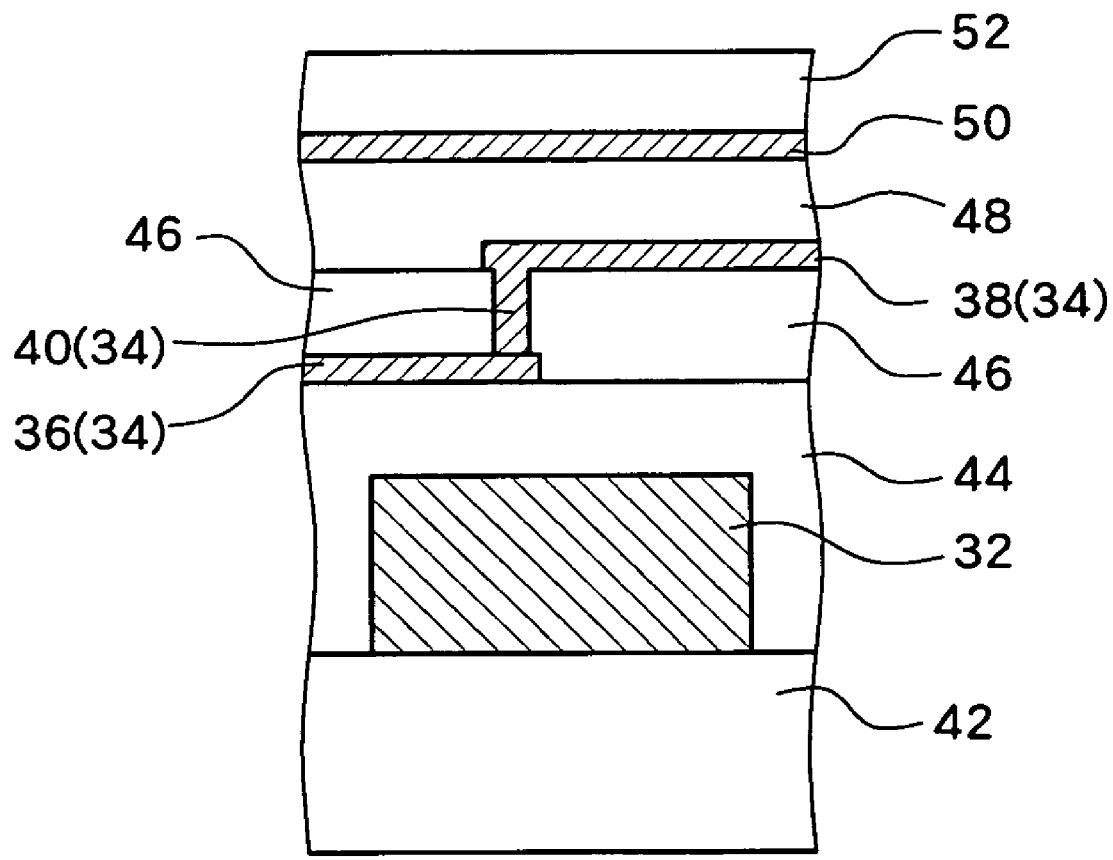
FIG. 6 is a cross sectional view taken along line A-A of FIG. 5.

Although the structure of the present embodiment is similar to the conventional structure shown in FIGS. 5 and 6 with respect to the layout of the connecting portion of the first conductive layer 36 and the second conductive layer 38, it differs from the conventional structure in that the first conductive layer 36 is formed such that the first conductive layer 36 does not overlap the power source potential layer 32a. In other words, according to the present embodiment, a portion of the power source potential layer 32a is removed, so that in the region 54 immediately above the power source potential layer 32a, a layer (the second conductive layer 38 in the present example) other than the lowermost layer of the plurality of conductive layers, is used as a connection line 34 extending across the power potential layer 32a. As described above, according to the present embodiment, the power source potential layer 32a is kept as far away from the connection line 34 an possible, so that stray capacitance between these layers is reduced and noise is prevented from entering the connection line 34 from the power source potential layer 32a via this stray capacitance.

Further, according to the present embodiment, the width Wd1 of the power source potential layer 32a in the above described region having a cutout portion is made smaller than the width Wd0 of the remaining region. In this manner, the region where the power source potential layer 32a overlaps the connection line 34 (which is, in this case, the second conductive layer 38) is made smaller to further reduce the stray capacitance, thereby achieving further reduction in noise entering from the power source potential layer 32a to the connection line 34.

Embodiment 2

Figure 9:
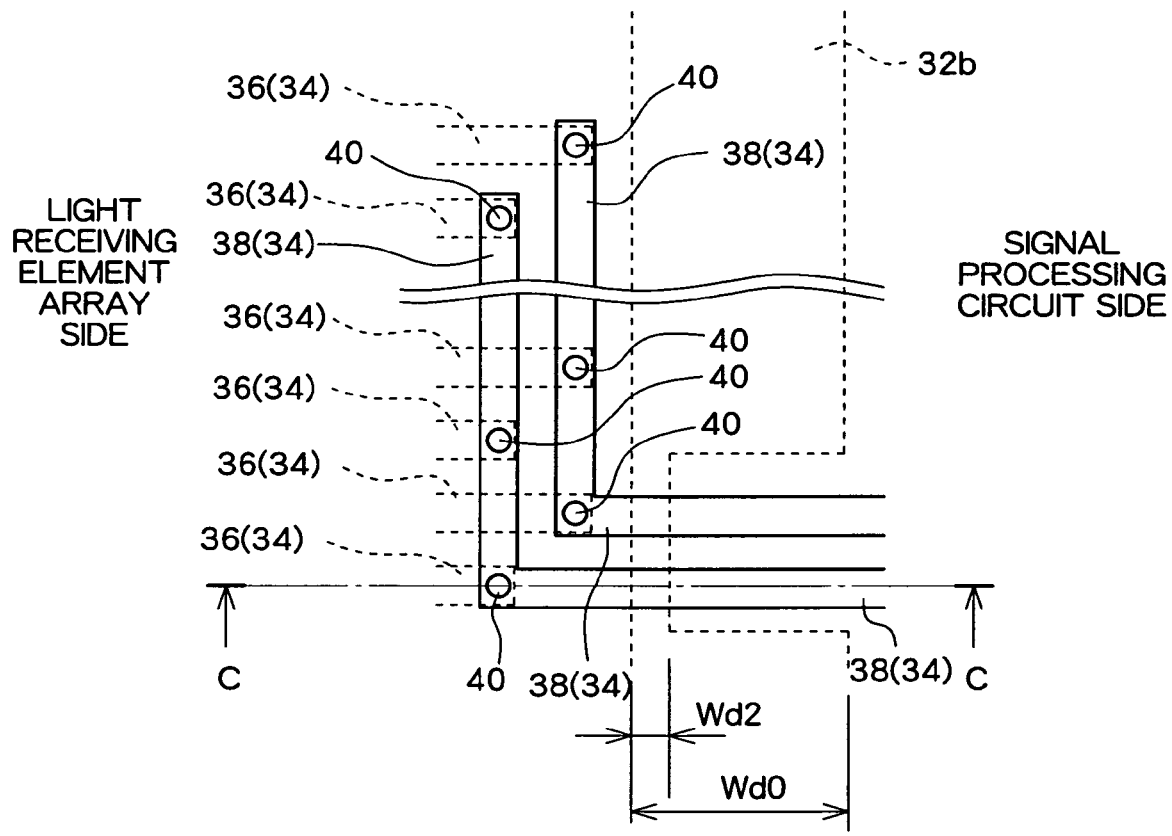
FIG. 9 is an enlarged plan view showing a boundary region, on the side of the light receiving element array, of a signal processing circuit included in an integrated circuit for optical encoder according to another embodiment of the present invention.
Figure 10:
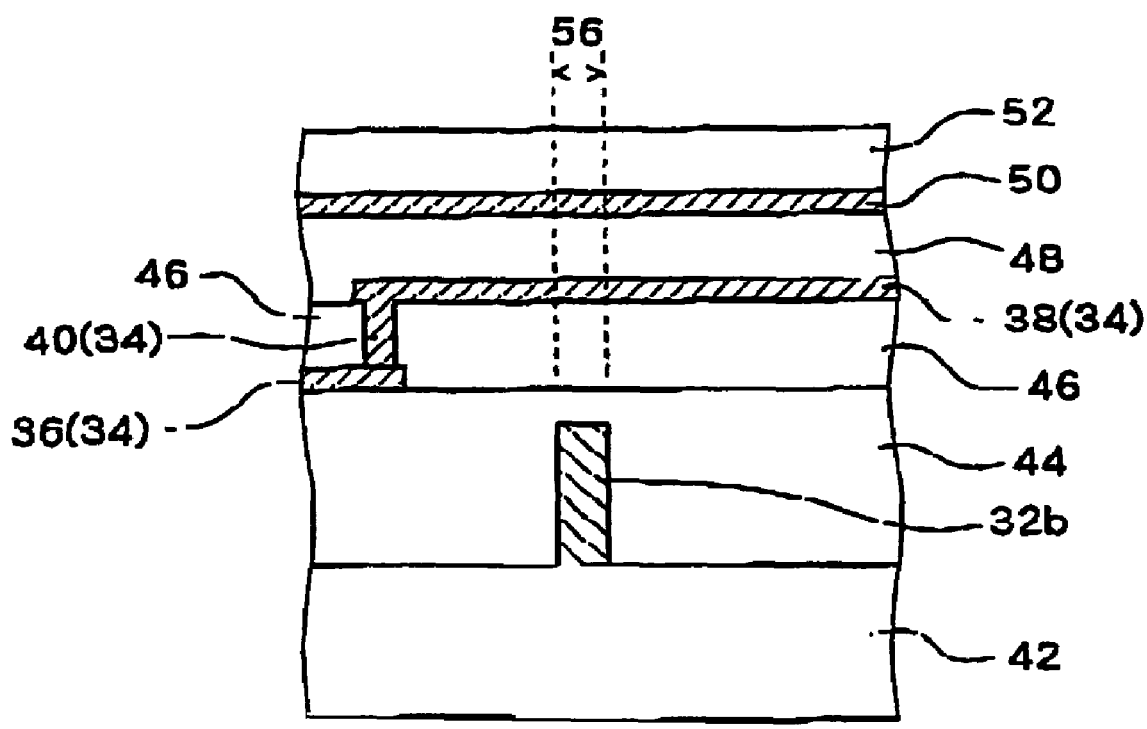
FIG. 10 is a cross sectional view taken along line C-C of FIG. 9.

FIG. 9 is an enlarged plan view showing a main portion of the boundary region (corresponding to the region L in FIG. 2), on the side of the light receiving element array 18, of the signal processing circuit included in an integrated circuit in accordance with a second embodiment of the present invention, and FIG. 10 is a cross sectional view taken along line C—C of FIG. 9. The integrated circuit according to the second embodiment can also be formed to have a structure similar to that of the first embodiment described above, except the region L. Therefore, in the following description, similar elements are denoted by the same numerals as used above, and their description will not be repeated.

As shown in FIG. 9, although the layout of the connecting portion of the first conductive layer 36 and the second conductive layer 38 is the same as that shown in FIGS. 7 and 8, the second embodiment differs from the first embodiment in that these connection structures are shifted toward the light receiving element array 18 from the location of the connection structures shown in FIG. 7. According to the present embodiment, similar to the first embodiment, in the region 56 immediately above the power potential layer 32b, the lowermost layer (which is the first conductive layer 36 of the present embodiment) of the plurality of conductive layers is not disposed, and a layer (which is the second conductive layer 30 in the present embodiment) other than the lowermost layer is used as a connection line 34 which extends across the power potential layer 32b in this immediately above region 56. As described above, according to the present embodiment, similar to the first embodiment, the power source potential layer 32b is kept as far away from the connection line 34 as possible, so that stray capacitance between these layers is reduced and noise is prevented from entering the connection line 34 from the power source potential layer 32b via this stray capacitance.

Further, in the present embodiment, a portion of the power source potential layer 32b is removed only in the portion where the power source potential layer 32b intersects the connection line 34, so that the width Wd2 of the power source potential layer 32b in the region having the cutout portion is smaller than the width Wd0 the remaining portion (namely, the portion where the power source potential layer 32b does not cross the connection line 34). Thus, the region where the power source potential layer 32b overlaps the connection line 34 (which is, in this case, the second conductive layer 38) is made smaller to further reduce the stray capacitance, thereby achieving further reduction in noise entering the connection line 34 from the power source potential layer 32b.

While the preferred embodiments of the present invention have been described, the present invention is not limited to the above embodiments. For example, although in the examples used to illustrate both of the above embodiments two conductive layers are used as the connection line, the method is also applicable when three or more conductive layers are used. Further, the structure of the present invention may be adopted to any type of integrated circuit in which a plurality of conductive layers are formed at locations higher than at least the power source potential layer and at least one of these conductive layers is uses as a connection line intersecting the power source potential layer, regardless of the number of connection lines and the connecting structure of the conductive layers.

According to the present invention, because, in the region where a connection line for connecting a light receiving element and a signal processing section thereof intersect each other, stray capacitance between the power source potential layer and the connection line can be reduced, it is possible to reduce power source noise entering the connection line from the power source potential layer. This makes it possible to increase the position detection accuracy of the optical encoder or improve the reliability of the signal processing section and the light receiving elements.

What is claimed is:

1. An integrated circuit for an optical encoder, comprising:
   a signal processing section for generating a position detection signal from a detection signal of a light receiving element;
   a belt-like power source potential layer formed at least between the signal processing section and the light receiving element, electrical potential of the power source potential layer being set to power source potential level; and
   a plurality of conductive layers formed at different heights at locations above the power source potential layer,
   wherein, in a region immediately above the power source potential layer, a connection line for electrically connecting the light receiving element and the signal processing section is formed by one of the plurality of conductive layers other than the lowermost layer; and
   wherein the width of the power source potential layer in the region where the power source potential layer is overlapped by the connection line is smaller than the width of the power source potential layer in the remaining region.

2. An integrated circuit for an optical encoder, comprising:
   a group of lower conductive layers including a lower conductive layer connected to each of light receiving elements belonging to a first group of light receiving elements and a lower conductive layer connected to each of light receiving elements belonging to a second group of light receiving elements, the lower conductive layers being alternately disposed in parallel to each other and being first conductive layers;
   two upper conductive layers disposed in parallel to each other at locations above the lower conductive layers, and which are provided corresponding to the two groups of light receiving elements, respectively, each upper conductive layer including a first region extending in the direction intersecting the extending direction of the lower conductive layers and a second region extending along the extending direction of the lower conductive layers, the upper conductive layers being second conductive layers;

a plurality of through holes connecting the lower conductive layers corresponding to each group of light receiving elements with the corresponding first region of the upper conductive layer; and a power source potential layer provided in an even lower place than the lower conductive layers, the power source potential layer extending in the direction which intersects the extending direction of the lower conductive layers and crossing the second region of the upper conductive layer under the section region of the upper conductive layer, without crossing the lower conductive layers;

wherein the width of the power source potential layer in the portion crossing the second region of the upper conductive layer under the second region of the upper conductive layer is smaller than the width of the power source potential layer in the remaining portion.

* * * * *